United States Patent [19]

Kooijman

[11] Patent Number: 5,252,864

[45] Date of Patent: Oct. 12, 1993

[54] NORMALIZATION CIRCUIT FOR A MEASURING DEVICE

[75] Inventor: Cornelis S. Kooijman, Eindhoven, Netherlands

[73] Assignee: U. S. Philips Corporation, New York, N.Y.

[21] Appl. No.: 777,990

[22] Filed: Oct. 17, 1991

[30] Foreign Application Priority Data

Oct. 19, 1990 [NL] Netherlands ............... 9002279

[51] Int. Cl.$^5$ .................... G06F 7/556; G01R 7/00
[52] U.S. Cl. ................... 307/492; 307/529; 329/145; 324/140 R
[58] Field of Search ............ 307/492, 529; 328/145; 324/140 R-D, 140 D

[56] References Cited

U.S. PATENT DOCUMENTS

| | | | |
|---|---|---|---|
| 3,571,618 | 3/1971 | Inacker et al. | 307/492 |
| 4,453,091 | 6/1984 | Katakura et al. | 307/492 |
| 4,972,512 | 11/1990 | Garskamp | 307/492 |
| 5,136,192 | 8/1992 | Kooijman | 307/492 |

*Primary Examiner*—Timothy P. Callahan
*Attorney, Agent, or Firm*—Bernard Franzblau

[57] ABSTRACT

A measuring device comprises at least two transducer units for sensing input quantities ($A_i$) and for producing signals which are proportional to the logarithm of the input quantities. The measuring device also includes a normalization circuit which determines the ratio of a linear combination of input quantities to the sum of the input quantities. The normalization circuit thus comprises a number of first identical bipolar transistors which correspond to the number of input quantities. The transistors include a base, an emitter and a collector. An output signal of a transducer unit is applied to the base of the corresponding first transistor. The emitters of these transistors are collectively connected to a constant current source via an emitter junction.

19 Claims, 3 Drawing Sheets

NORMALIZATION CIRCUIT FOR A MEASURING DEVICE

BACKGROUND OF THE INVENTION

This invention relates to a measuring device comprising at least two transducer units each provided with a sensor for sensing an input quantity and for producing a signal which is dependent on the input quantity, and also comprising a normalization circuit which determines the ratio of a linear combination of input quantities to the sum of the input quantities.

The invention also relates to a normalization circuit suitable for use in a measuring device in accordance with the invention.

A measuring device of this kind is known from the publication "Optical position sensing using silicon photodetectors" by Bill Light in Lasers and Applications, April 1986, pp. 75–79. The cited article describes some position-sensitive detectors (PSD) which are constructed using photodiodes in a bi-cell, quadrant and lateral configuration. Such detectors enable, for example determination of the position of a laser spot. The signals required for the X and Y displacement of the spot can be found by suitably summing or subtracting the diode currents, followed by normalization to the total intensity. To this end, the detectors described in the cited publication comprise two or four current-voltage converters for first converting the signals to the voltage domain, a number of subtraction and summing circuits, and two analog dividers. The drawbacks of those detectors are that the procedure is rather complex and that a variety of errors is introduced by the various components.

SUMMARY OF THE INVENTION

It is an object of the invention to provide a measuring device of the kind set forth in which said drawbacks are mitigated.

To achieve this, the measuring device in accordance with the invention is characterized in that each transducer unit comprises converter means for converting the input quantities into signals which are proportional to the logarithm of the input quantities, a normalization circuit comprising a number of first, identical bipolar transistors which corresponds to the number of input quantities, said transistors comprising a base. An emitter and a collector, an output signal of the converter means is applied to the base of a first transistor, the emitters of the first transistors being collectively connected to a constant current source via an emitter junction. As a result of the described step, the diode currents are directly converted into a logarithmic voltage, followed by further processing by means of a normalization circuit, so that the procedure is substantially simplified and fewer errors are introduced.

A preferred embodiment of the measuring device in accordance with the invention is characterized in that the converter means form a part of the sensor. When the sensors already incorporate a logarithmic relationship between the quantity to be measured and the output voltage, the normalization circuit can be connected directly to the sensors.

An alternative preferred embodiment of the measuring device in accordance with the invention is characterized in that the signal produced by the sensor is linearly proportional to the detected input quantity sensed, and the converter means comprising a logarithm converter is included in the transducer unit. The signals applied to the normalization circuit, originally being linearly proportional to the input quantities, thus also exhibit a logarithmic relationship with the corresponding input quantities.

A further preferred embodiment of the measuring device in accordance with the invention is characterized in that the measuring device comprises a series of photodiodes which are accommodated on the same substrate as the normalization circuit and whose anodes are connected to the base of the first transistors, their cathodes being collectively connected together.

Another preferred embodiment of the measuring device in accordance with the invention is characterized in that the measuring device comprises a series of photodiodes which are accommodated on the same substrate as the normalization circuit, the cathodes of said photodiodes being collectively connected to a voltage source, their anodes being connected to respective collectors of second transistors whose emitters are collectively connected to a point of constant potential. The bases of the first transistors are connected to respective bases and collectors of the second transistors.

Another preferred embodiment of the measuring device in accordance with the invention is characterized in that the measuring device comprises a series of sensor circuits which are accommodated on the same substrate as the first transistors and which are connected to the base of the first transistors whose emitters are collectively connected to a constant current source and whose collectors are interconnected via a series of resistance elements, which series comprises two contact points. In the latter three embodiments the measuring device is more compact. Which is an advantage for applications where the dimensions of the components are preferably minimized, for example, in optical disc recording.

Another preferred embodiment of the measuring device in accordance with the invention is characterized in that the measuring device is constructed as a quadrant detector comprising four photodiodes and an appropriate number of transistors. Both series of photodiodes integrated with a normalization circuit can be constructed as a quadrant detector.

BRIEF DESCRIPTION OF THE DRAWING

The invention will be described in detail hereinafter with reference to the accompanying drawing in which.

DESCRIPTION OF THE PREFERRED EMBODIMENTS

Figure 1:
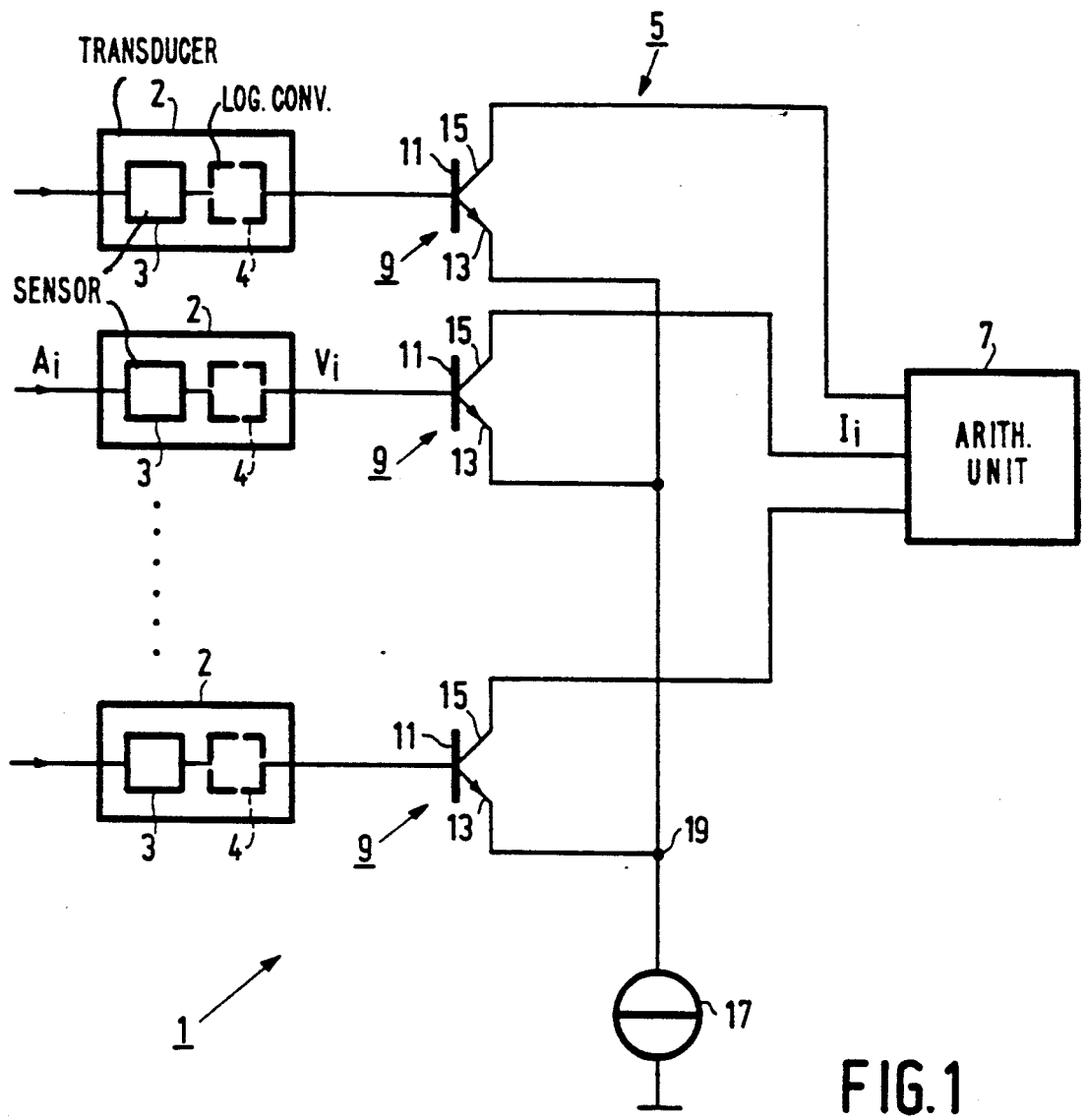
FIG. 1 diagrammatically shows a measuring device in accordance with the invention.

The measuring device 1, which is diagrammatically shown in FIG. 1, comprises a number of transducer units 2 for sensing input quantities $A_i$, a normalization circuit 5 for normalizing these input quantities, and an arithmetic unit 7. Generally speaking, the normalization circuit 5 comprises a number of first, identical bipolar transistors 9 which corresponds at least to the number of input quantities, said transistors comprising a base 11, an emitter 13 and a collector 15. The normalization circuit also comprises a constant current source 17. Normalization is substantially simplified when it is ensured that the output signals of the transducer units 2 are proportional to the logarithm of the corresponding input quantities $A_i$. To this end, each transducer unit 2 comprises a sensor 3 and a logarithmic converter 4. In some cases the output signals of the sensors 3 may already be proportional to the logarithm of the input quantities $A_i$. In that case the logarithmic converters 4, denoted by a broken line, can be omitted. The output signal of each transducer unit 2 is then applied to the base 11 of the corresponding transistor 9. The emitters 13 of all of the transistors 9 are collectively connected to the constant current source 17 via an emitter junction 19. The output quantity $I_i$ supplied by a collector 15 can subsequently be applied to the arithmetic unit 7 for further processing, if necessary. The logarithmic relationship between the input quantities $A_i$ and the output signals of the transducer units 2, for example output voltages $V_i$, can be written as follows $$V_i = V_o \cdot \ln(A_i) \tag{1}$$

Therein, $V_o$ is a proportionality constant yet to be determined. An arbitrary collector current $I_i$ of a transistor 9 having a base-emitter voltage $V_{bei}$ satisfies:

$$I_i = I_s \cdot \exp[(V_{bei})/V_t] = I_s \cdot \exp[(V_i - V_e)/V_t] \tag{2}$$

Therein, $I_s$ is the reverse current of each transistor, $V_e$ is the voltage across the emitter junction and $V_t$ equals $kT/q$ ($\approx 25$ mV at room temperature). The base current of the transistors is assumed to be negligibly small. Moreover:

$$I_e = \sum_{i=1}^{n} I_i = I_s \cdot \exp[-V_e/V_t] \cdot \left( \sum_{i=1}^{n} \exp[V_i/V_t] \right) \tag{3}$$

If:

$$V_o = V_t, \tag{4}$$

it follows, considering (1) and (3) that:

$$I_s \cdot \exp[-V_e/V_t] = I_e / \left( \sum_{i=1}^{n} A_i \right) \tag{5}$$

Substitution in (2) produces:

$$I_i = \frac{A_i}{A_1 + A_2 + \ldots A_n} \cdot I_e \tag{6}$$

The latter expression represents the desired relationship between an input quantity $A_i$ and the associated output current $I_i$. It is important that the relation (4) is satisfied.

To this end, it is necessary to compensate for the temperature dependency of $V_t$. This can be realized, for example, by keeping the transistors 9 of the normalization circuit 5 and the logarithmic converter 4 at a constant temperature. The logarithm of the sum of the input quantities can also be expressed by means of the voltage $V_e$ across the emitter junction. Equation (5) can be rewritten as:

$$\exp\left[\frac{V_e}{V_t}\right] = \frac{I_s \sum_{i=1}^{n} A_i}{I_e}$$

or $$V_e = V_t \ln\left[\frac{I_s}{I_e}\right] + V_t \ln\left[\sum_{i=1}^{n} A_i\right]$$

The first term is a constant, provided that the temperature is constant. This term is in the order of magnitude of $-0.6$ V.

The logarithmic relationship between the input quantities $A_i$ and the output signals of the transducer units 2 can be achieved by means of a number of circuits which are known per se. One possibility consists in that the relationship between the input quantities to be normalized and the output signals of the sensors 3 is linear. In that case the transducer unit 2 is formed by a sensor 3, followed by a logarithmic converter 4, so that the signals applied to the normalization circuit 5 are proportional to the logarithm of the input quantities.

Figure 2A:
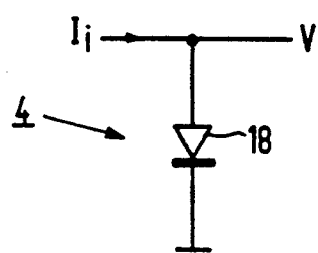
FIGS. 2a and 2b show two embodiments of a logarithmic converter for use in a measuring device in accordance with the invention.
Figure 2B:
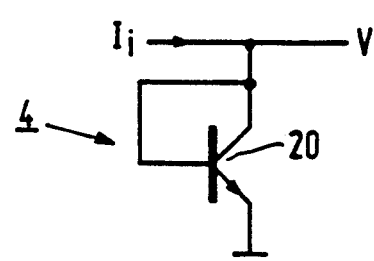

A first embodiment thereof consists of a diode 18 or a transistor 20 which is connected as a diode as shown in FIGS. 2a and 2b, respectively. The output signal V is then given by:

$$V = \frac{kt}{q} \ln \frac{I_i}{I_s}.$$

Figure 3:
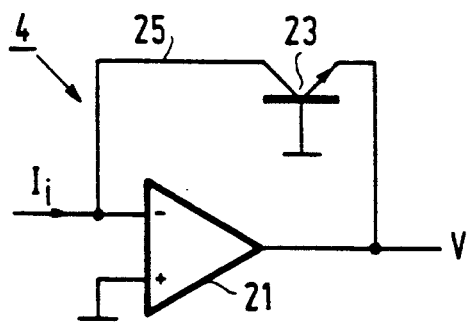
FIG. 3 shows a third embodiment of a logarithmic converter.

An operational amplifier 21 having a transistor 23 connected in the feedback path 25, as shown in FIG. 3, represents a second embodiment of the logarithmic converter. Such a circuit is described in detail in the publication "A circuit with logarithmic transfer response over 9 decades" by J. F. Gibbons and H. S. Horn in IEEE Transactions on Circuit Theory, pp. 378–384, September 1964. The output voltage is then negative:

$$V = -\frac{kt}{q} \ln \frac{I_i}{I_s}$$

Figure 4:
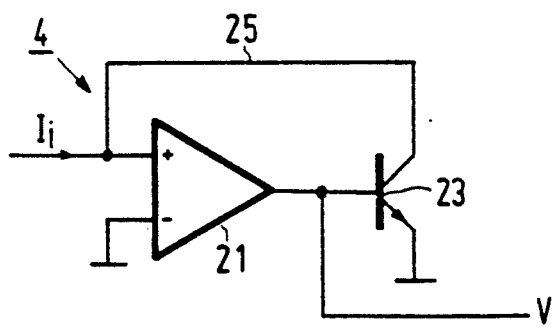
FIG. 4 shows an alternative embodiment of the logarithmic converter shown in FIG. 3.

An alternative version thereof, in which a positive output voltage is generated, is shown in FIG. 4. The relationship between the input current and the output voltage is thus given by:

$$V = \frac{kt}{q} \ln \frac{I_i}{I_s}$$

In the above embodiment, the relationship between the input current $I_i$ and the output voltage V is generally given by:

$$V = V_t \ln \frac{I_i}{I_s}$$

Therein, $I_s$ is the reverse current of the diode or the transistors and $V_t = kT/q$. The relation $V_o = V_t$ is then automatically satisfied, provided that all transistors have the same temperature.

Application of a logarithmic converter 4 of the type shown in FIG. 4 provides a circuit in which the performance as regards speed, dynamic range and resolution are more than one order of magnitude better than that of the conventional circuit comprising an analog divider as described in the cited publication by B. Light (dynamic range 1:1000, inaccuracy 0.05%, bandwidth 150 kHz.).

A fourth embodiment consists of logarithmic converters based on the "successive detection" principle. This principle is described in detail in the publication "A true logarithmic amplifier for radar IF applications" by W. L. Barber and E. R. Brown in IEEE Journal Solid State Circuits, Vol. SC-15, No. 3, pp. 291–295, June 1980.

A fifth embodiment concerns logarithmic converters based on the exponential relationship between time and the voltage across a capacitor which is charged or discharged by a resistor. This is described in the publication "A simple low-frequency logarithmic converter using logarithmic pulse width modulation technique" by S. D. Marougi in IEEE Transactions on Instrumentation and Measurement, Vol. IM-34, No. 3, pp. 473–475, September 1985.

Converters of the kind such as the fourth and the fifth embodiment produce an output voltage which generally needs to be amplified or attenuated in order to satisfy the relation $V_o = V_t$.

Another possibility consists in that the sensor output signals are already proportional to the logarithm of the input quantities, so that the normalization circuit 5 can be connected directly to the sensors.

A first embodiment in this respect is formed by a photodiode in which the photovoltaic effect occurs. The output quantity, being a voltage, is a logarithmic representation of the input quantity, being the light intensity. When the temperature of the photodiodes and the normalization circuit is the same:

$$V_o = \frac{kT}{q},$$

so that the relation $V_o = V_t$ is satisfied.

Another embodiment in which the relationship between light intensity and output voltage is logarithmic is formed by a photodetector as described in the U.S. Pat. No. 4,473,836.

Figure 5:
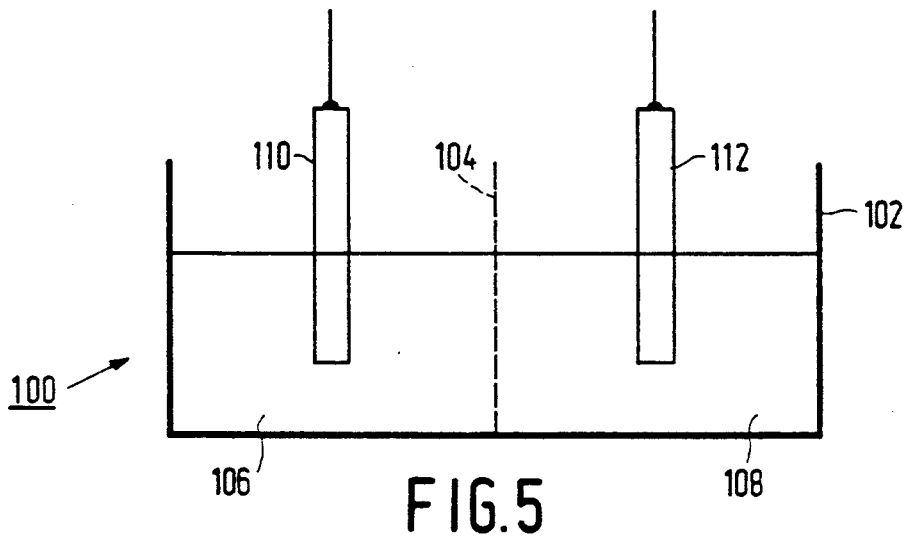
FIG. 5 diagrammatically shows a part of a measuring device suitable for use in a device in accordance with the invention.

An entirely different class of sensors is formed by the ion concentration meters, for example, PH meters. The output voltage is logarithmically dependent on the ion concentration. An embodiment in this respect is a hydrogen ion concentration measuring device 100 as shown in FIG. 5. The measuring device 100 consists of a container 102 in which a porous partition 104 is arranged. To the left of the porous partition 104 there is introduced an electrolyte 106 having a known H+ ion concentration $C_N$. To the right of the porous partition 104 there is introduced an electrolyte 108 with the H+ ion concentration $C_x$ to be measured. No H+ ions are exchanged through the porous partition 104. Hydrogen electrodes 110, 112 are immersed in electrolytes 106, 108, respectively. These electrodes 110, 112 may consist of, for example, platinum which has absorbed hydrogen. The voltage $\Delta V_N$ between the electrode 110 and the electrolyte 106 satisfies Nernst's relation:

$$\Delta V_N = \frac{kT}{q} \ln \frac{C_N}{C_K}$$

The same holds true for the voltage $\Delta V_x$ between the electrode 112 and the electrolyte 108:

$$\Delta V_X = \frac{kT}{q} \ln \left[ \frac{C_X}{C_K} \right]$$

Therein, $C_x$ is the H+ ion concentration to be measured, $C_N$ is the known H+ ion concentration, and $C_K$ is the boundary concentration on the electrodes 110, 112, so that the voltage between the two electrodes 110, 112 is given by:

$$\Delta V = \Delta V_X - \Delta V_N = \frac{kT}{q} \ln \frac{C_X}{C_N}$$

Figure 6:
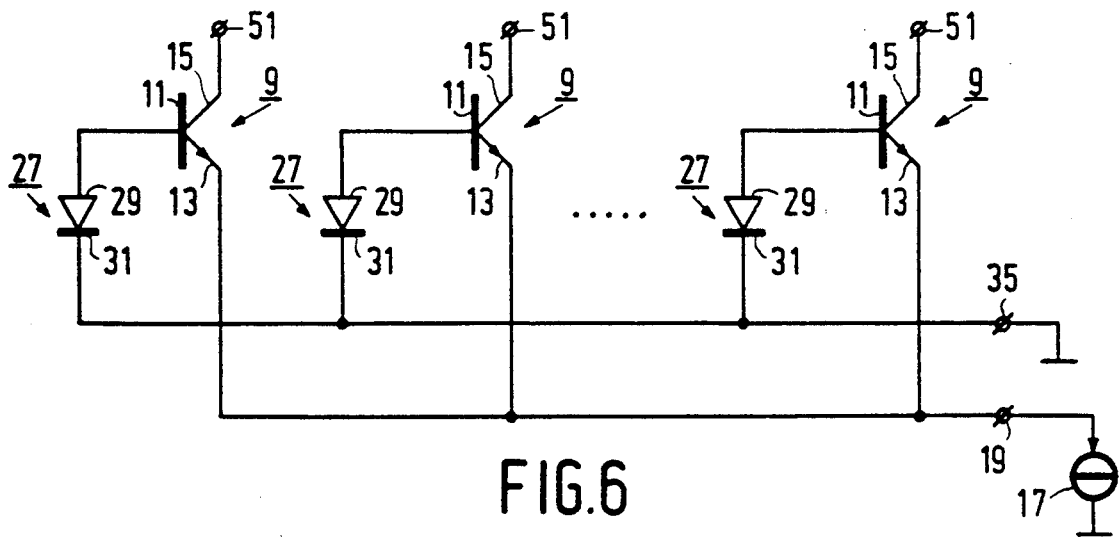
FIG. 6 shows a first embodiment of a series of photodiodes integrated with a normalization circuit.

In order to make the measuring device more compact, a series of photodiodes 27 can be accommodated, together with the normalization circuit 5, on the same substrate. FIG. 6 shows an embodiment in this respect. The anodes 29 of the photodiodes 27 are connected to the respective bases 11 of the first transistors 9, the diode cathodes 31 being collectively connected to a point 35 of constant potential. The emitters 13 of the transistors are collectively connected to the constant current source 17 via the emitter junction 19. When a current $I_o$ is extracted from the common emitter junction of the transistors 9 (junction 19), any collector current of the transistors 9 will be proportional to the quotient of the photocurrent of the associated photodiode 27 and the sum of the photocurrents. The scale factor is $I_o$. Normalization can also be de-activated by means of the external circuit by connecting the junction 19 to a fixed voltage (not shown). If this voltage is lower than the voltage at the point 35, the photocurrent is amplified by the transistor 9.

Figure 7:
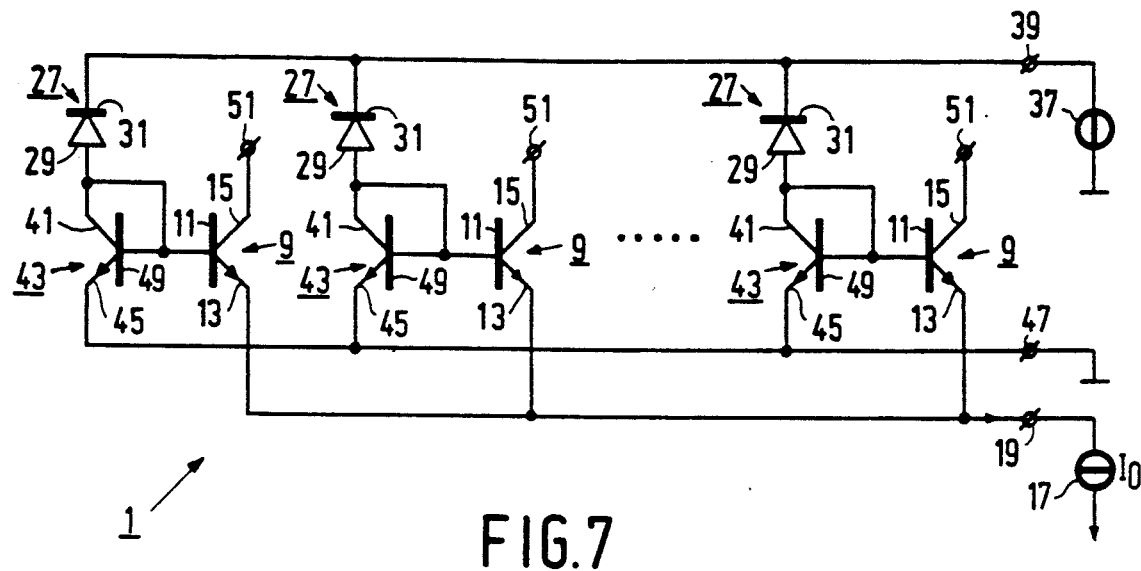
FIG. 7 shows a second embodiment of a series of photodiodes integrated with a normalization circuit.

FIG. 7 shows another embodiment of a detector integrated with the normalization circuit 5. The cathodes 31 of the photodiodes 27 are collectively connected to a voltage source 37 via a junction 39, the anodes 29 being connected to the respective collectors 41 of second transistors 43. The emmiters 45 of the transistors 43 are collectively connected to a point 47 of constant potential. The base 49 of each transistor 43 is connected to the collector 41 of the same transistor 43 and to the base 11 of the corresponding first transistor 9. Furthermore, the emitters 13 of the first transistors 9 are collectively connected to the constant current source 17 via the emitter junction 19. In the present embodiment the photodiodes 27 have a reverse bias voltage so that the output current is linearly proportional to the light intensity (photo-amperage effect). The logarithmic converter 4 is of the same type as shown in FIG. 2b. This detector can be comparatively simply realised. One of the possibilities in this respect is a monolithic structure where a compromise must be found between the quality of the photodiodes on the one hand and the quality of the transistors on the other hand. A further possibility consists in a hybrid structure, for example, in a thick-film or thin-film technique.

The latter circuits can in principle both be composed using an arbitrary number of photodiodes in different configurations, for example, bi-cell, quadrant, circular or linear array. Bi-cell and quadrant photodiode configurations are often used to detect the position of a light spot which spreads across the surface of diodes. Using the arithmetic unit 7, the signals required for the X and Y displacement of the spot can be found by suitably summing or subtracting the diode currents. This technique is used inter alia, in optical disc recording, for example, in CD/VLP players, and for sensing distance and location in the measuring technique. In many cases the intensity-dependency of these sensors is undesirable, thus necessitating normalization of the diode currents.

Figure 8:
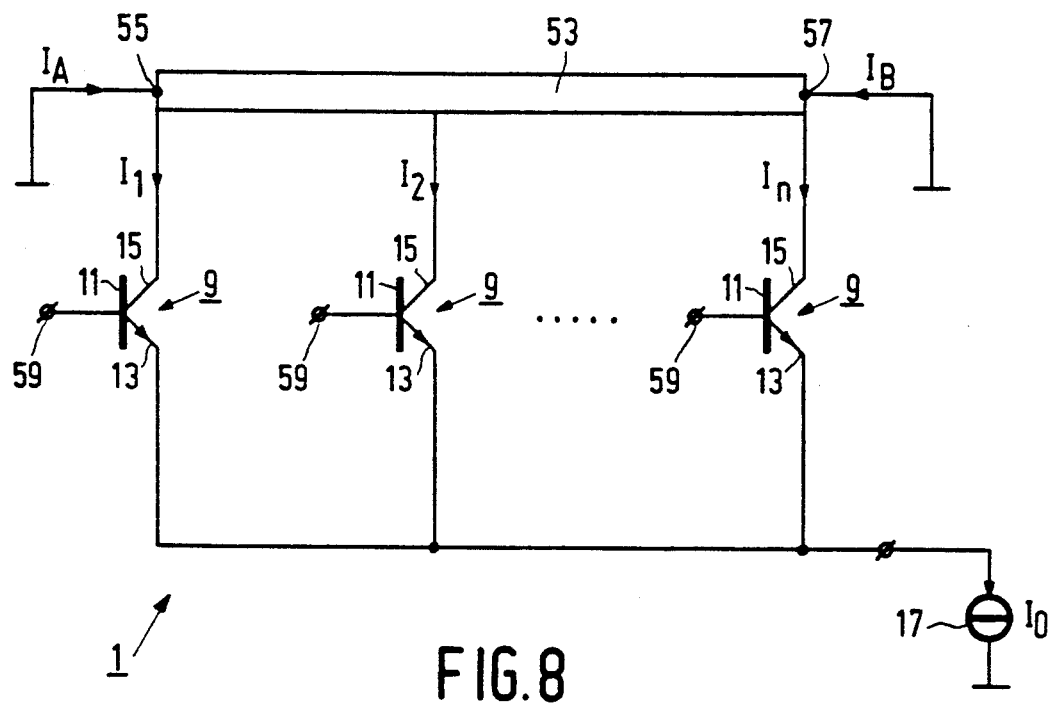
FIG. 8 shows a further embodiment of a measuring device in accordance with the invention.

When the number of collector connections 51 of a transistor array, as shown in FIG. 6 and FIG. 7, is reduced to two, such a circuit can be used, for example, for optical centre of gravity determination. FIG. 8 shows an example in this respect. The collectors 15 are no longer separated but interconnected via resistance elements 53. Only the ends 55, 57 of the transistor array are contacted. The resistance elements 53 may consist of, for example, a resistance layer as in the present embodiment. However, they can alternatively be formed by discrete resistors. Under the influence of the resistance elements 53, the currents $I_A$ and $I_B$ to the two contacts 55, 57 differ. They represent the centre of gravity of the current distribution $I_1, I_2, \ldots, I_n$. The sensor circuits (not shown) are connected to terminals 59, which are connected to the respective bases 11 of the first transistors 9 and supply the input signal. The sensors may consist of a diode 27 as shown in FIG. 6 or of a diode 27 with a transistor 43 as shown in FIG. 7. Furthermore, the emitters 13 of the transistors 9 are collectively connected to a constant current source 17 for a current $I_o$.

I claim:

1. A measuring device comprising; at least two transducer units provided with a sensor for sensing an input quantity and for producing a signal which is dependent on the input quantity, a normalization circuit which determines the ratio of a linear combination of a number of input quantities to the sum of the input quantities, characterized in that each transducer unit comprises converter means for converting the input quantities into signals which are proportional to the logarithm of the input quantities, the normalization circuit comprising a number of first identical bipolar transistors which correspond to the number of input quantities, said transistors comprising a base, an emitter and a collector, means for applying an output signal of the converter means to the base of a first transistor, and wherein the emitters of the first transistors are collectively connected to a constant current source via an emitter junction.

2. A measuring device as claimed in claim 1, wherein the converter means form a part of the sensor.

3. A measuring device as claimed in claim 1, wherein the signal produced by the sensor is linearly proportional to the input quantity sensed, and the converter means in the transducer unit comprise a logarithmic converter.

4. A measuring device as claimed in claim 2, wherein the measuring device sensors comprise a series of photodiodes which are accommodated on a same substrate as the normalization circuit and whose anodes are connected to respective bases of the first transistors, their cathodes being collectively connected together.

5. A measuring device as claimed in claim 3, wherein the measuring device sensors comprise a series of photodiodes which are accommodated on a same substrate as the normalization circuit, the cathodes of said photodiodes being collectively connected to a voltage source, their anodes being connected to respective collectors of second transistors whose emitters are collectively connected to a point of constant potential, and means connecting respective bases of the first transistors to respective bases and collectors of the second transistors.

6. A measuring device as claimed in claim 1, wherein the measuring device sensors comprise a series of photodiodes which are accommodated on a same substrate as the first transistors and which are connected to respective bases of the first transistors, and wherein collectors of the first transistors are interconnected via a series of resistance elements which comprises two contact points.

7. A measuring device as claimed in claim 6 comprising a series of four photodiodes arranged to form a quadrant detector, and the number of first transistors is four.

8. A measuring device as claimed in claim 2, wherein the measuring device sensors comprise a series of sensor circuits which are accommodated on a same substrate as the first transistors and which are connected to respective bases of the first transistors, and wherein collectors of the first transistors are interconnected via a series of resistance elements which comprises two contact points.

9. A measuring device as claimed in claim 4 comprising a series of four photodiodes arranged to form a quadrant detector, and the number of first transistors is four.

10. A measuring device as claimed in claim 3 wherein said sensors comprise photodiodes accommodated on a same substrate as the first transistors and which are connected to respective bases of the first transistors, and wherein collectors of the first transistors are interconnected via a series of resistance elements which comprises two contact points.

11. A measuring device as claimed in claim 10 comprising a series of four photodiodes arranged to form a quadrant detector, and the number of first transistors is four.

12. A measuring device as claimed in claim 5 comprising a series of four photodiodes arranged to form a quadrant detector, and the number of first transistors is four.

13. A normalization circuit for a measuring device including a plurality of transducer units each with a sensor for sensing an input quantity and a converter for converting its respective input quantity into a respective signal proportional to the logarithm of the input quantity, the normalization circuit comprising: a number of identical bipolar transistors, one for each input quantity, each bipolar transistor having a base, an emitter and a collector, and means for applying respective output signals of the transducer units to respective bases of the bipolar transistors, and means collectively connecting the emitters of the bipolar transistors to a constant current source via an emitter junction whereby the normalization circuit determines the ratio of a linear combination of said input quantities to the sum of said input quantities.

14. A measuring device as claimed in claim 1 wherein the output signals ($V_i$) of the transducer units are $V_i = V_o \ln (A_i)$ where $A_i$ is an input quantity and $V_o = V_t = KT/q$, where T is temperature.

15. A measuring device as claimed in claim 1 wherein the output signals (V) of the converter means are given by $V = kt/q \ln I_i/I_s$, where k is a constant, t is temperature, $I_i$ is the collector current of a first transistor and $I_s$ is the reverse current of said first transistor.

16. A measuring device comprising:
a plurality of transducer units each with a sensor for sensing an input quantity and for producing a signal which is dependent on the input quantity, each transducer unit further comprising a converter coupled to its respective sensor whereby the converters convert the input quantities into corresponding signals proportional to the logarithm of the input quantities, and
a normalization circuit which determines the ratio of a linear combination of input quantities to the sum of the input quantities, said normalization circuit comprising;
a number of identical bipolar transistors, one for each input quantity, each bipolar transistor having a base, an emitter and a collector, and means for applying respective output signals of the transducer units to respective bases of the transistors, and means collectively connecting the emitters of the transistors to a constant current source via an emitter junction.

17. A measuring device as claimed in claim 16 further comprising:
an arithmetic unit coupled to the collectors of the bipolar transistors.

18. A measuring device as claimed in claim 16 wherein at least one of said sensors produces a signal which varies linearly with its input quantity and its respective converter comprises a logarithmic converter.

19. A measuring device as claimed in claim 16 wherein the sensors comprise photodiodes and said photodiodes and said bipolar transistors are a part of a single substrate, each of said photodiodes having a first terminal connected to a base of its respective bipolar transistor, and wherein second terminals of each of said photodiodes are connected together to a point of reference voltage.

* * * * *